United States Patent [19]

Nishi et al.

[11] Patent Number: 4,607,713
[45] Date of Patent: Aug. 26, 1986

[54] DISTRIBUTING TABLE CONSTRUCTION FOR USE IN COMBINATIONAL WEIGHING APPARATUS

[75] Inventors: Hitoshi Nishi, Ohtsu; Asahiro Izumi, Kusatsu; Sadanobu Nishiyama, Shiga, all of Japan

[73] Assignee: Ishida Scales Mfg. Co., Ltd., Kyoto, Japan

[21] Appl. No.: 744,745

[22] Filed: Jun. 14, 1985

[30] Foreign Application Priority Data

Jun. 15, 1984 [JP] Japan ............................. 59-88075[U]

[51] Int. Cl.⁴ ...................... G01G 19/22; G01G 21/28
[52] U.S. Cl. ........................................ 177/25; 177/58; 177/DIG. 11
[58] Field of Search ........... 177/25, 58, 145, DIG. 11; 198/533, 756

[56] References Cited

U.S. PATENT DOCUMENTS

4,066,164 1/1978 Easton ................................. 198/533
4,552,236 11/1985 Mikami ................................. 177/25

Primary Examiner—George H. Miller, Jr.
Attorney, Agent, or Firm—Staas & Halsey

[57] ABSTRACT

A distributing table construction in a combinatorial weighing apparatus includes a conical main table mounted on a vibrator and slanted at a relatively small angle for distributing and supplying articles to be weighed, such as pieces of cheese or jelly, into a number of radial troughs, and a smaller-diameter conical subtable disposed over the conical main table and connected thereto by a bolt, the conical subtable being slanted at an angle larger than the small angle of the conical main table. The conical subtable is adjustable in height by the bolt and a weld nut threaded thereover and attached to the subtable. The conical subtable serves to supply articles from an article charger easily onto the main table and allow the supplied articles to be deposited sufficiently on the main table so that the articles can stably be supplied to the radial troughs.

7 Claims, 9 Drawing Figures

DISTRIBUTING TABLE CONSTRUCTION FOR USE IN COMBINATIONAL WEIGHING APPARATUS

BACKGROUND OF THE INVENTION

1. Field of the Invention

The present invention relates to a supply construction in a combinatorial weighing apparatus having a number of weighing machines disposed in a circular pattern and supplied with articles such as pieces of cheese or jelly charged downwardly for weighing these articles according to preset weights.

2. Description of the Prior Art

In the field of material handling, it is widely practiced to handle various articles of merchandise as units having preset or unfixed weights. For example, a technique has widely been employed for weighing and packaging many particles such as snack foods or candies as units according to preset weights.

The applicant has already invented various combinatorial weighing apparatus and filed patent applications in various countries for such combinatorial weighing apparatus. In weighing particles, it is not permissible from the standpoint of business to package them as a unit which has an actual weight smaller than a preset weight. Therefore, it is important for the combinatorial weighing apparatus to weigh particles so as to give a weight which is slightly larger than the preset weight.

Figure 1:
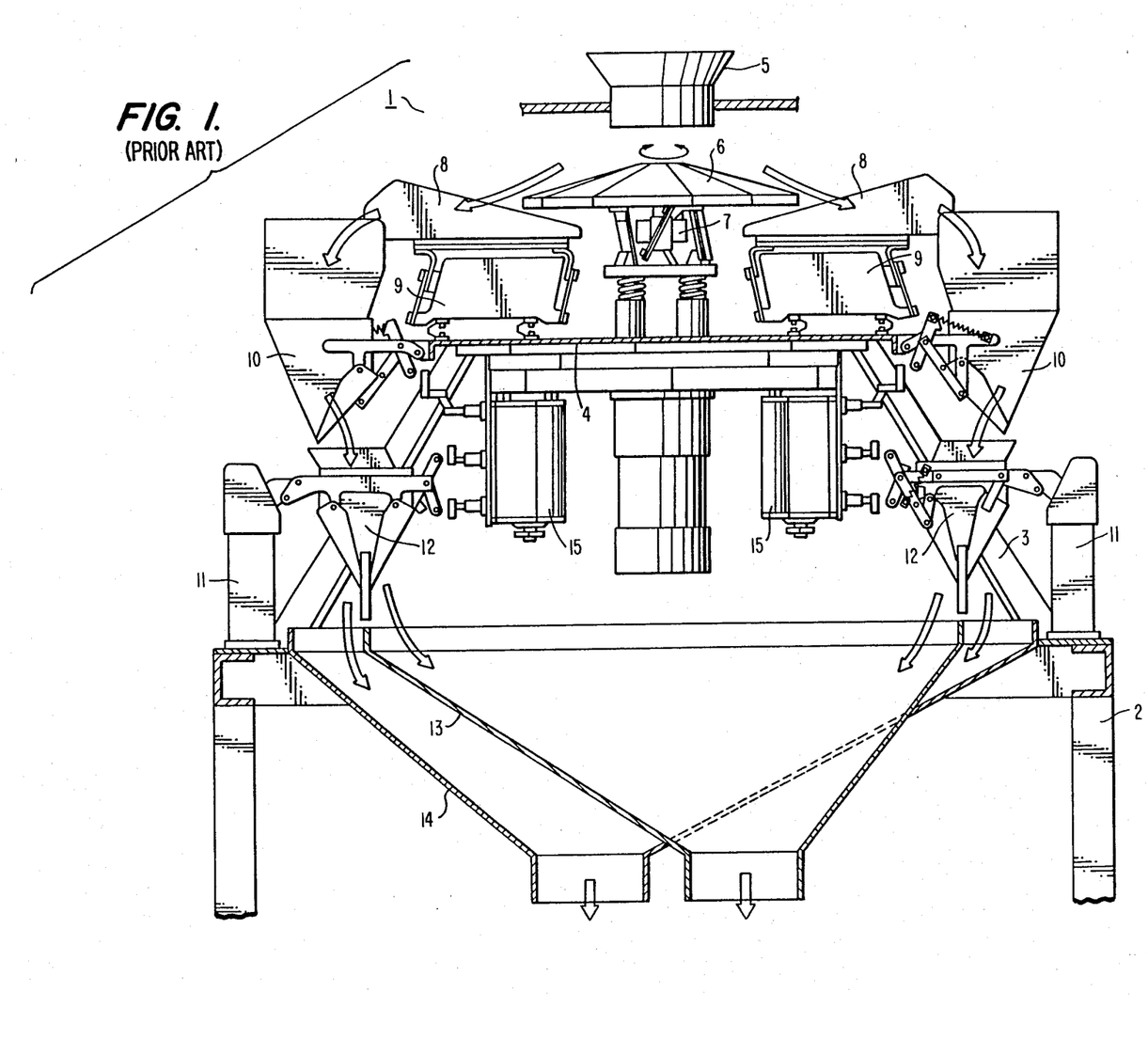
FIG. 1 is a partly sectional side elevational view of a conventional prior art combinatorial weighing apparatus.

According to U.S. Pat. No. 4,399,880, a combinatorial weighing apparatus has ten weighing hoppers, for example, arranged in a circular pattern and supplied randomly with articles to be weighed. The weights are combined and weight combinations are selected to find an optimum weight combination which is slightly greater than a preset weight according to the theory and experiences of probability and statistics. FIG. 1 of the accompanying drawings shows such a disclosed combinatorial weighing apparatus. The combinatorial weighing apparatus, generally designated at 1, has a frame 2 on which an upper frame 4 is mounted by a subframe 3. The upper frame 4 supports on its central portion a conical disk-shaped distributing table 6 disposed below an article charger 5 positioned above the frame 2, the distributing table 6 being mounted on a vibrator 7 which is reciprocally vibratable through a prescribed angle in a circumferential direction. A plurality of (such as ten) troughs 8 (only two shown in FIG. 1) are disposed radially around the distributing table 6 and supported by suitable electromagnetic vibrators 9. The troughs 8 have their radially outward discharge ends positioned in pool hoppers 10, respectively, which have outlets opening toward weighing hoppers 12 supported on weight detectors 11 mounted on the frame 2 and including known load cells or the like. The weighing hoppers 12 have outlets opening toward lower collection chutes 13, 14.

Articles to be weighed which are carried on a conveyor or the like are charged from the charger 5 onto the distributing table 6. The distributing table 6 is reciprocally vibrated and turned through the given angle in the circumferential direction to distribute the articles as uniformly as possible into the troughs 8 through which the articles are supplied into the pool hoppers 10. The pool hoppers 10 are controlled by driver units 15 supported on the upper frame 4 for opening and closing their lids to feed the articles into the weighing hoppers 12, whereupon the supplied articles are weighed by the weight detectors 11. Those weighing hoppers 12 which give an optimum weight combination that is slightly larger than a preset weight are determined by a microcomputer (not shown). These selected weighing hoppers 12 are driven by the driver units 15 controlled by a control unit to open their lids for discharging the articles into either the collection chute 13 or 14 from which the articles are delivered to a packaging machine, not shown.

In the above process, no correct weighing and combinatorial operation would be carried out unless the articles were supplied from the distributing table 6 substantially uniformly into the troughs 8.

As shown in FIG. 1, the internal construction of the combinatorial weighing apparatus 1 is complex especially because of the necessity for enabling the apparatus to take up a reduced space. Therefore, if articles were to overflow from the vibrating distributing table 6 into the apparatus construction, the apparatus 1 would be caused to malfunction, and would have to be maintained and inspected at frequent intervals.

The distributing table 6 has a conical shape generally formed by pressing and hence has a simple slanted surface. The distributing table 6, when vibrated and turned, supplies the articles from its slanted conical surface substantially uniformly into the troughs 8 arranged around the distributing table 6. As shown in FIG. 1, the troughs 8 are mounted on the electromagnetic vibrators 9 so that only those troughs 8 which have been selected to give an optimum weight combination and have discharged the articles in a preceeding weighing cycle will be vibrated radially so as to be supplied with articles again. The bottoms of the troughs 8 are disposed downwardly of the peripheral edge of the distributing table 6. Articles to be distributed into the troughs 8 are temporarily stored on the distributing table 6 before they are supplied into the troughs 8. When certain weighing hoppers 12 are selected, the corresponding troughs 8 are radially vibrated to advance the articles. If some of the weighing hoppers 12 are selected less frequently, then articles in the corresponding troughs 8 tend to be deposited therein and overflow from the rear ends of the troughs 8 onto the upper frame 4. If some weighing hoppers 12 are selected too frequently, then the corresponding troughs 8 are liable to run short of articles.

Where articles such as pieces of cheese or jelly having sticky surfaces are to be weighed, the distributing table having the slanted suface designed to store the articles temporarily thereon tends to distribute and supply the sticky articles irregularly as masses. Since the central portion of the distributing table as it is vibrated spirally is moved more vertically than circumferentially, articles are apt to remain deposited on the central portion of the table rather than being distributed radially outwardly. When such deposited articles are in excess of a certain limit, they collapse together and are supplied irregularly into the troughs.

Therefore, in order to cope with the prior combinatorial weighing apparatus drawbacks discussed above, the apparatus has been required to be seviced and inspected frequently during normal operation.

SUMMARY OF THE INVENTION

It is an object of the present invention to provide a distributing table construction for use in a combinatorial weighing apparatus which can uniformly distribute articles to be weighed into troughs more reliably, and which prevents the articles from overflowing or dropping into the apparatus construction thus assuring better weighing operation in the field of material handling.

Another object of the present invention is to provide a distributing table construction for use in a combinatorial weighing apparatus which can achieve the above object even if the combinatorial weighing apparatus has a mechanism for detecting the condition of how articles are deposited on the distributing table.

According to the present invention, articles charged from above to a distributing table construction disposed on an upper portion of a combinatorial weighing apparatus are supplied onto a smaller-diameter conical subtable slanted at a relatively large angle. The articles are then supplied from the conical subtable uniformly radially outwardly onto a larger-diameter conical main table disposed beneath the conical subtable. Since the conical main table is slanted at an angle smaller than the angle of inclination of the conical subtable, the supplied articles can be stocked sufficiently but prevented from remaining deposited on the central portion of the main table so as to provide a sufficient supply of the articles to a number of radial troughs disposed around the main table. The articles are distributed and supplied from the peripheral edge of the main table into the radial troughs uniformly at a prescribed speed. The articles supplied to the radial troughs are then fed into pool hoppers from which the articles are charged into weighing hoppers. The articles in the weighing hoppers are weighed by weight detectors, and the detected weights are supplied to a computer which selects a weight combination that is slightly larger than a preset target weight. The lids of those weighing hoppers which give such a weight combination are opened to discharge the articles that are then delivered to a packaging machine. With the distributing table construction, therefore, articles to be weighed can be supplied stably to the radial troughs at all times.

According to the present invention, the distributing table construction has a lower conical main table and an upper conical subtable, the upper conical subtable having a table body slanted at an angle larger than the slanting angle of the table body of the lower main table. Articles charged from above the distributing table construction are supplied quickly down the sharply slanting main table of the upper conical subtable onto the lower conical main table. Therefore, the articles are prevented from remaining deposited on the central portion of the conical main table. The articles can stably and sufficiently be supplied from the peripheral edge of the conical main table into the radial troughs since the articles as they are moved from the central portion to peripheral edge of the main table are not localized or become insufficient in quantity.

Inasmuch as the charged articles are first supplied onto the upper conical subtable and then onto the lower conical main table, the articles can be supplied unifornlly radially outwardly onto the central portion of the conical main table, and hence they can be reliably and uniformly distributed and supplied from the main table into the radial troughs.

According to certain embodiments of the present invention, the upper conical subtable can be adjusted in height with respect to the lower conical main table. Therefore, depending on the property of articles to be weighed, the height of the upper conical subtable can be adjusted for an optimum distribution and supply of articles of varying properties.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 2:
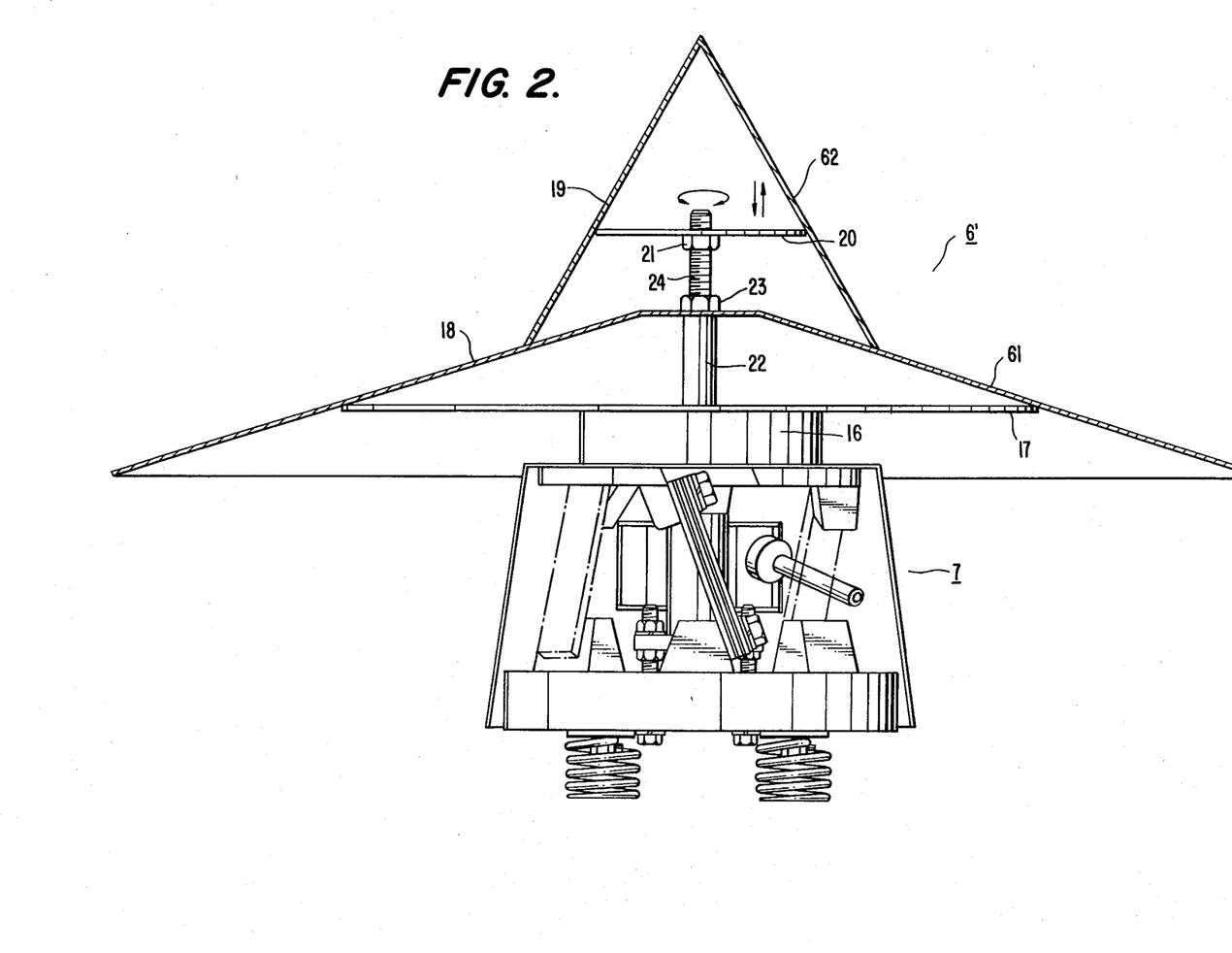
FIG. 2 is a cross-sectional view of a distributing table construction according to a first embodiment of the present invention.

FIG. 2 shows a distributing table construction according to a first embodiment of the present invention. The distributing table construction, generally indicated by the reference character 6', is disposed on an upper end of a combinatorial weighing apparatus for weighing articles such as pieces of cheese or jelly. The distributing table construction 6' includes a lower conical main table 61 having a table body 18 in the form of a truncated cone slanted at a small angle. The main table 61 is supported on a circular plate 17 mounted by a bracket 16 on an electromagnetic vibrator 7 which is identical to the electromagnetic vibrator 7 shown in FIG. 1 for spiral vibratory motion. The distributing table construction 6' is surrounded by a number of radial troughs (fourteen troughs, for example) arranged in a circular pattern such as that prveviously described in connection with the trough 8 shown in FIG. 1.

A conical subtable 62 is mounted on the upper portion of the conical main table 61 in concentric relation thereto, the conical subtable 62 having a maximum diameter smaller than the diameter of the bottom of the main table 61. The subtable 62 includes a table body 19 having its side slanted at an angle much larger than the angle of inclination of the table body 18 of the conical main table 61. A circular plate 20 is disposed in the table body 19 and welded thereto, with a weld nut 21 being welded centrally to the circular plate 20.

The table body 18 of the lower conical main table 61 includes an upper horizontal portion having a central hole defined therein. A bracket 22 is mounted vertically on the center of the circular plate 17 disposed in the main table 61. A bolt 24 is attached to an end of the bracket 22 and extends through a central hole in the upper horizontal portion of the table body 18, which is fastened against the bracket 22 by a nut 23 to fix the table body 18 to the vibrator 7. The bolt 24 threadedly extends through the weld nut 21 and the circular plate 20 to position the conical subtable 62 concentrically with the lower conical main table 61.

When assembling the conical subtable 62 with the conical main table 61, the weld nut 21 on the plate 20 is threaded over the bolt 24 from its upper end and the conical subtable 62 is turned until the lower edge of the table body 19 thereof is held against the table body 18 of the conical main table 61.

With the conical main table 61 and the conical subtable 62 thus assembled to form the distributing table construction 6', the combinatorial weighing apparatus is operated for a combinatorial weighing operation. The vibrator 7 is actuated to spirally vibrate the distributing table construction 6' to enable articles such as pieces of cheese or jelly supplied from above to be distributed and supplied into the troughs arranged around the distributing table construction 6'.

In the article distributing and supplying process, the articles suplied onto the upper conical subtable 62 directly from above are caused to flow quickly along the conical subtable 62 onto the table body 18 of the lower larger-diameter conical main table 61 since the side of the table body 19 is slanted sharply.

Inasmuch as the table body 18 of the conical main table 61 is slanted less sharply than the table body 19 of the upper conical subtable 61, the supplied articles do not flow quickly but tend to be deposited on the central portion of the table body 19 from which the articles are gradually supplied uniformly into the troughs 8 under distribution and supply action due to the spiral turning movement of the vibrator 7.

The articles are deposited sufficiently on the central portion of the conical main table 61 since the articles are quickly supplied from the upper conical subtable 62 toward the central portion of the conical main table 61. The articles are then distributed radially outwardly from the central portion of the conical main table 61 by the spiral turning movement caused by the vibrator 7. Therefore, the articles are prevented from being irregularly or locally positioned or reduced in number on the periperal edge of the main table 61.

The distributing table construction 6' is therefore capable of operating to supply articles uniformly with time into the radial troughs 8 for enabling the troughs 8 to supply the articles to the pool hoppers 10 (FIG. 1) which are intermittently opened and closed as the weighing hoppers 12 (FIG. 1) are uniformly opened and closed intermittently.

A lock nut may be disposed on the bolt 24 below the weld nut 21 for adjusting the height of the conical subtable 62 with respect to the conical main table 61 to thereby adjust the amount of articles to be deposited on the table body 18 at the lower end of the conical subtable 62.

Figure 3:
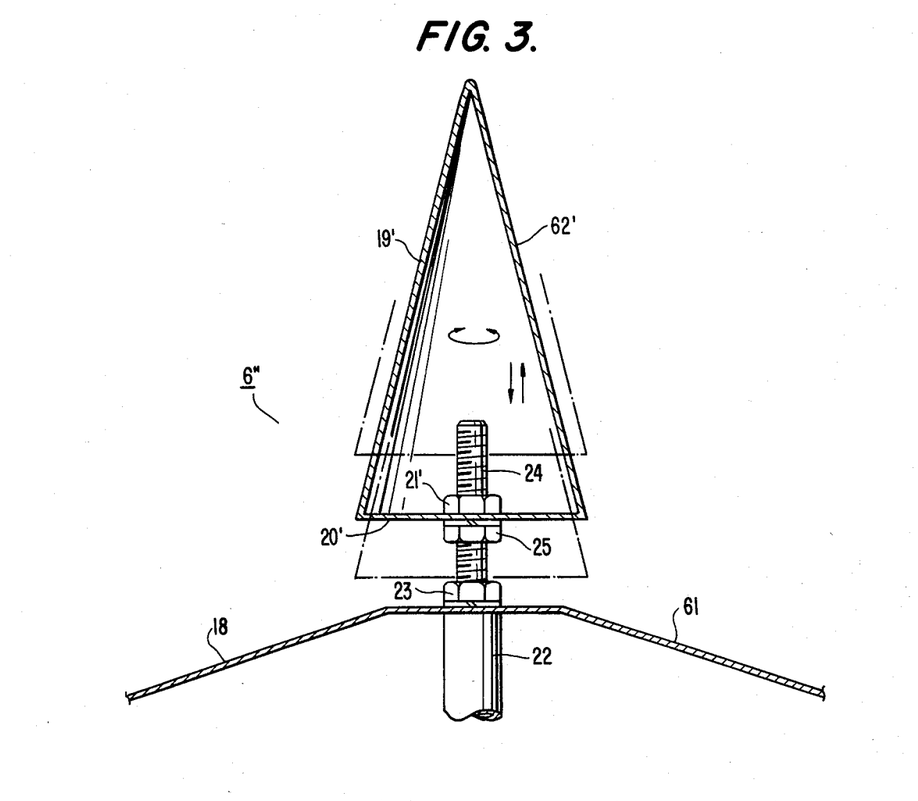
FIG. 3 is a cross-sectional view of a portion of a distributing table construction according to a second embodiment of the present invention.

FIG. 3 shows a second embodiment of the invention in which a conical subtable 62' has a table body 19' with its side slanted more sharply than the table body 19 of FIG. 2. A weld nut 21' is fixed to the upper surface of a plate 20' integral with the lower end of the table body 19' and a lock nut 25 is held against the lower surface of the plate 20', the weld nut 21' and the lock nut 25 being threaded over the bolt 24. By turning the nuts 21', 25 to adjust the height of the conical subtable 62' with respect to the conical main table 61, the quantity of articles deposited on the central portion of the conical main table 61 can be increased sufficiently to provide a sufficient supply of articles from the conical main table 61 to the radial troughs 8. With the embodiment of FIG. 3, the distributing table construction is effective in supplying sticky articles which would otherwise find relative difficulty in getting supplied from the distributing table into the troughs.

Figure 4:
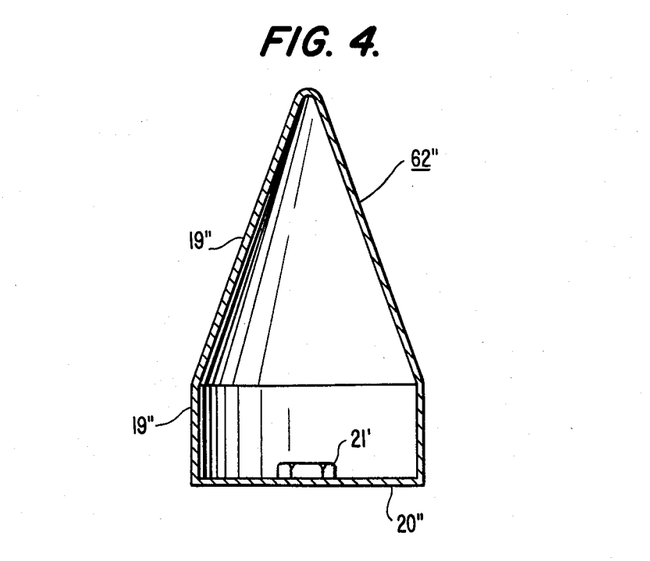
FIG. 4 is a cross-sectional view of a portion of a distributing table construction according to a third embodiment of the present invention.

FIG. 4 shows a conical subtable 62" according to a third embodiment of the present invention. The conical subtable 62" has a table body 19" with its upper tip end rounded, a straight skirt portion 19'" extending from the lower end of the table body 19", and a plate 20" integral with the skirt portion 19'". A weld nut 21' is integrally formed on the upper surface of the plate 20". The conical subtable 62" is suitable for use with articles in the form of chips as it prevents the articles from being stocked out of balance at the central portion of the conical main table beneath the conical subtable.

Many general combinatorial weighing machines including the combinatorial weighing machine shown in FIG. 1 incorporate an optical sensor mechanism for detecting the manner in which articles are deposited on the distributing table 6. The following embodiments are designed for use in combinatorial weighing apparatus having such optical sensor mechanisms.

Figure 5:
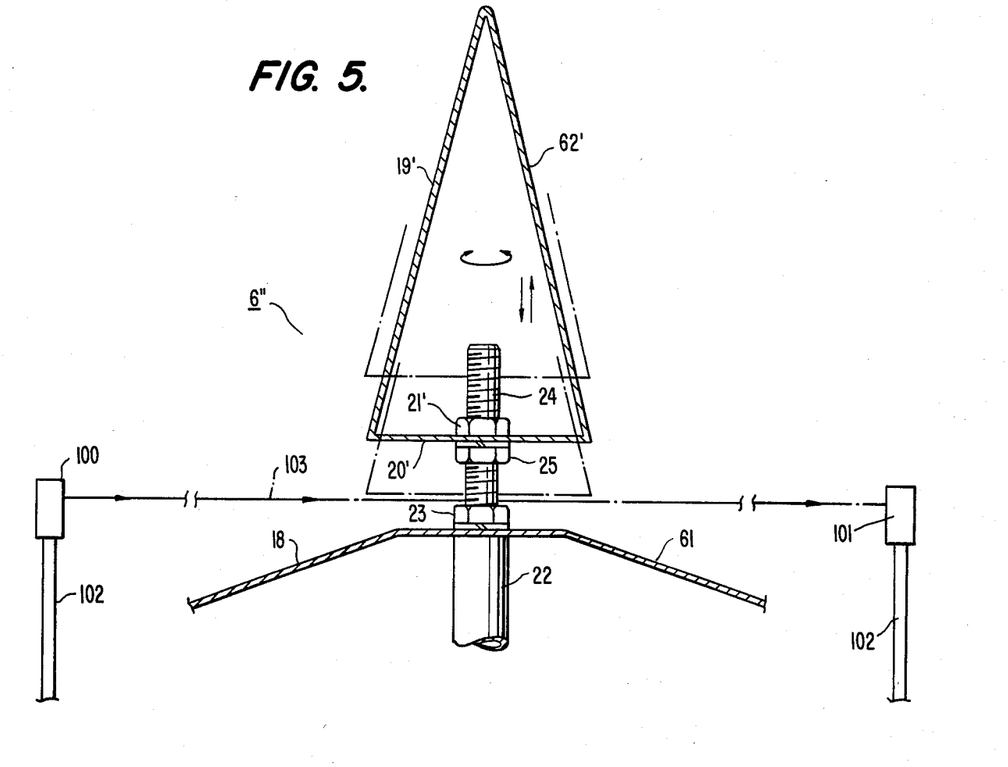
FIG. 5 is a cross-sectional view of a portion of a distributing table construction according to a fourth embodiment of the present invention.

In FIG. 5, a light-emitting device 100 for emitting a narrow beam, such as an infrared or visible light, is composed of a light-emitting element, such as a semiconductor, and a lens system for converging the light emitted from the light-emitting element into a beam. A light-detector device 101 for detecting the light beam from the light-emitting device 100 comprises a light-detector element such as a semiconductor and a lens system for focusing the light beam from the light-emitting device 100 onto the light-detector element. The light-emitting device 100 and the light-detector device 101 are mounted on upstanding studs 102, respectively, supported on the frame 2 (FIG. 1) of the combinatorial weighing apparatus. The axis 103 of the light beam emitted from the light-emitting device 10 is deviated from a diametrical line of the main table 61. With this arrangement, the light beam generated by the light-emitting device 100 reaches the light-detector device 101 without being disturbed by the bolt 24.

While the combinatorial weighing apparatus is in operation, if no articles are deposited below the lower end of the conical subtable 62', the light beam emitted from the light-emitting device 100 is not interrupted and is detected by the light-detector device 101, which issues a signal to a control system composed of a computer (not shown) which then generates a command for charging additional articles. In response to this command, articles are charged from the article charger 5 onto the conical subtable 62' from which they fall on the table body 18. The articles are then supplied into the pool hoppers 10. As the articles are deposited on the table body 18 below the subtable 62', the light beam from the light-emitting device 100 is interrupted, and the light-detector device 101 detects such an beam interruption to stop supplying the articles from the charger 5.

Figure 6:
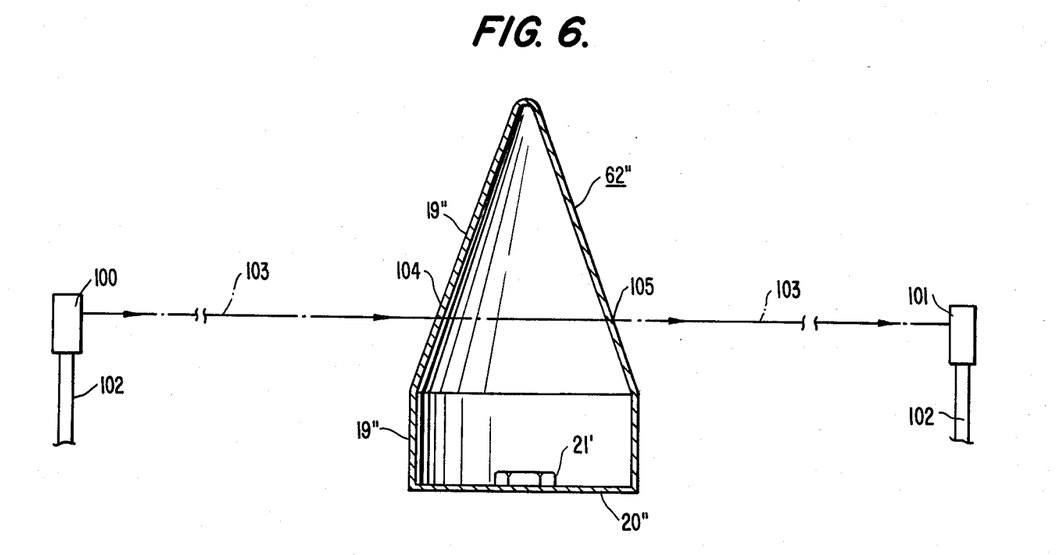
FIG. 6 is a cross-sectional view of a portion of a distributing table construction according to a fifth embodiment of the present invention.

FIG. 6 shows a fifth embodiment which incorporates the conical subtable 62" of FIG. 4 for automatically supplying articles. As illustrated, the table body 19" of the conical subtable 62" has two light-transmitting windows 104, 105 defined therein, and the light-emitting device 100 and the light-detector device 101 are arranged to pass the light beam along the axis 103 through the light-transmitting windows 104, 105. The light-transmitting windows 104, 105 may be defined in the skirt portion 19‴. The light-transmitting windows 104, 105 are covered with panels of a material such as glass or synthetic resin capable of transmitting the light beam therethrough and are of sufficient size not to interrupt the light beam when the table 62″ is moved vertically. Operation of the arrangement of FIG. 6 is the same as that of the arrangement of FIG. 5, and will not be described.

Figure 7:
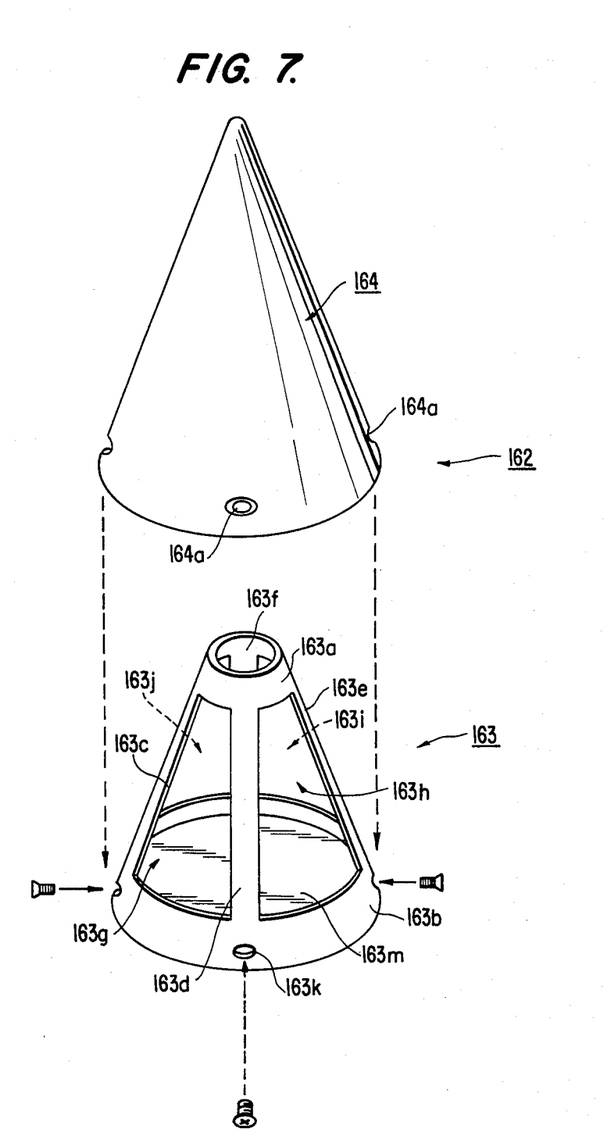
FIG. 7 is an exploded perspective view of a distributing table construction according to a sixth embodiment of the present invention.
Figure 8:
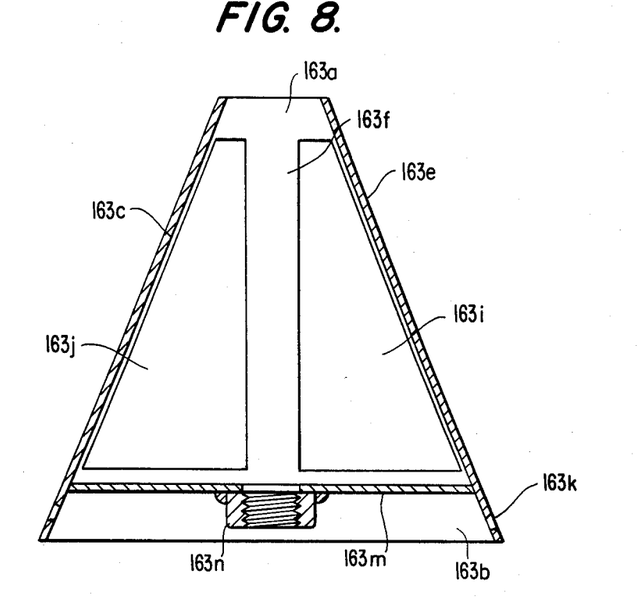
FIGS. 8 and 9 are cross-sectional views of components of the distributing table construction shown in FIG. 7.
Figure 9:
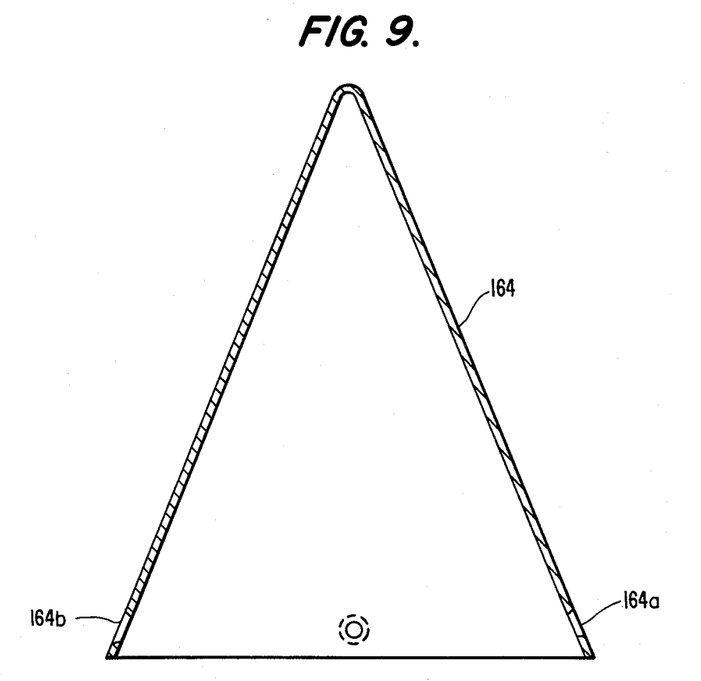

FIGS. 7 through 9 are illustrative of a sixth embodiment of the present invention. FIG. 7 shows a conical frame 163 made of a stainless steel sheet and having upper and lower ends 163a, 163b interconnected by four legs 163c through 163f. The upper and lower ends 163a, 163b and the four legs 163c, 163f jointly define four windows 163g through 163j therebetween. The lower end 163b has four screw holes 163k. As illustrated in FIG. 8, a plate 163m fixed as by welding to the inner surface of the lower end 163b and supports a weld nut 163n welded centrally thereto.

The frame 163 is covered with a conical cap 164 made of synthetic resin such as polycarbonate resin capable of passing a light beam therethrough or reinforced glass known as the trademark "Pyrex" capable of passing a light beam therethrough. As shown in FIG. 9, the cap 164 has in its lower end screw holes 164a to be registered with the screw holes 163k in the lower end 163b of the frame 163.

In assembly, the cap 164 is fitted over the frame 163 as indicated by the dotted lines in FIG. 7, and flush screws are threaded through the screw holes 163k, 164a to interconnect the cap 164 and the frame 163, thus producing a conical subtable 162. Although not shown, the conical subtable 162 is threaded over the bolt 64 projecting from the upper end of the conical main table 61 and is secured to the table body 18 of the conical main table 61. As thus assembled, a light beam emitted from the light-emitting device 100 passes through the cap 164 and a diametrical pair of the four windows 163g through 163j defined in the frame 163, and then reaches the light-detector device 101.

In the embodiment shown in FIG. 2, light-emitting and light-detector devices may be mounted on studs on the frame 2, and the conical subtable 62 may be arranged so as not to interrupt the axis of the light beam emitted from the light-emitting device and detected by the light-detector device, so that the manner in which articles are deposited on the main table 61 can be detected by the light beam.

Although certain preferred embodiments have been shown and described, it should be understood that many changes and modifications may be made therein without departing from the scope of the appended claims. For example, a fin or blade may be attached to the lower portion of the conical subtable so that the same can be pulled away from the conical main table by gripping the fin or blade.

What is claimed is:

1. A distributing table construction for use in a combinatorial weighing apparatus having a plurality of weighing mechanisms, a supply mechanism for supplying articles to be weighed into the weighing mechanisms, and means for combining the weights of the articles as measured by the weighing mechanisms, said distributing table construction comprising:
   (a) a vibrator disposed as a portion of said supply mechanism;
   (b) a conical main table operatively connected to said vibrator and having a surface slanted at a relatively small angle radially outwardly; and
   (c) a conical subtable mounted on said conical main table and having a lower end of an outside diameter smaller than the outside diameter of said conical main table, said conical subtable having a surface slanted at an angle larger than said relatively small angle of the surface of said conical main table.

2. A distributing table construction according to claim 1, including adjustable means for connecting said conical subtable and main table whereby the height of said conical subtable with respect to said conical main table may be varied.

3. A distributing table construction according to claim 2, wherein said conical subtable has light transmitting windows for transmitting a light beam therethrough, said windows being of sufficient size whereby said light beam is not interrupted where the height of said subtable with respect to said main table is varied.

4. A distributing table construction according to claim 1, wherein said conical subtable and main table have a clearance therebetween for passing a light beam therethrough.

5. A distributing table construction according to claim 1, wherein said conical subtable has light-transmitting windows for transmitting a light beam therethrough.

6. A distributing table construction according to claim 5, wherein said light-transmitting windows are covered with a material capable of transmitting the light beam therethrough.

7. A distributing table construction according to claim 1, wherein said conical subtable comprises a frame of metal and a cap made of a material capable of transmitting a light beam therethrough and fitted over said frame.

* * * * *